United States Patent
Steinfort et al.

(10) Patent No.: US 9,675,046 B2
(45) Date of Patent: Jun. 13, 2017

(54) ANIMAL TAG

(71) Applicant: Enduro Tags Pty LTD, Warragul. Victoria (AU)

(72) Inventors: John James Steinfort, Warragul (AU); Kurt Edmund Schnepf, Lilydale (AU); William John Hendriks, Lilydale (AU)

(73) Assignee: Enduro Tags Pty LTD, Warragul, Victoria (AU)

( * ) Notice: Subject to any disclaimer, the term of this patent is extended or adjusted under 35 U.S.C. 154(b) by 0 days.

(21) Appl. No.: 14/417,256

(22) PCT Filed: Jul. 26, 2013

(86) PCT No.: PCT/AU2013/000832
§ 371 (c)(1),
(2) Date: Jan. 26, 2015

(87) PCT Pub. No.: WO2014/015384
PCT Pub. Date: Jan. 30, 2014

(65) Prior Publication Data
US 2015/0223431 A1    Aug. 13, 2015

(30) Foreign Application Priority Data
Jul. 26, 2012    (AU) .................. 2012903202

(51) Int. Cl.
*G06K 19/00*    (2006.01)
*A01K 11/00*    (2006.01)
(Continued)

(52) U.S. Cl.
CPC .......... *A01K 11/006* (2013.01); *A01K 11/004* (2013.01); *B29C 45/14065* (2013.01);
(Continued)

(58) Field of Classification Search
CPC .... G07F 7/1008; G06Q 20/341; B42D 15/10; G06K 19/07749
(Continued)

(56) References Cited

U.S. PATENT DOCUMENTS

| 5,461,807 A | 10/1995 | Johnson |
| 5,768,813 A | 6/1998 | Reboul et al. |

(Continued)

FOREIGN PATENT DOCUMENTS

| EP | 2465344 A1 | 6/2012 |
| WO | 2004036984 A1 | 5/2004 |
| WO | 2009034058 A2 | 3/2009 |

OTHER PUBLICATIONS

International Search Report for Application No. PCT/AU2013/000832, Aug. 29, 2013.

*Primary Examiner* — Karl D Frech
(74) *Attorney, Agent, or Firm* — Wayne Edward Remage; Baker Donelson

(57) ABSTRACT

A tag for attachment to an animal including: a transponder casing (40) housing a transponder; a cartridge (12) for housing the transponder casing; a female component (10) and a male component (28) adapted to engage one another; said male component (28) having a pair of penetrating members (32, 34) and said female component (10) having a pair of apertures (14, 16), each aperture arranged to receive and retain a respective penetrating member when applied by an applicator through skin of the animal; wherein the cartridge (12) and transponder casing (40) are encapsulated within said tag to prevent dislodgment, movement or damage to the transponder.

17 Claims, 8 Drawing Sheets

(51) Int. Cl.
    *G06K 19/077*    (2006.01)
    *B29L 7/00*      (2006.01)
    *B29C 45/14*     (2006.01)
    *B29L 17/00*     (2006.01)

(52) U.S. Cl.
    CPC .. *G06K 19/07762* (2013.01); *B29C 45/14819* (2013.01); *B29C 2045/14131* (2013.01); *B29L 2007/004* (2013.01); *B29L 2017/006* (2013.01)

(58) Field of Classification Search
    USPC .......................................... 235/492, 487, 380
    See application file for complete search history.

(56) References Cited

U.S. PATENT DOCUMENTS

2009/0077844 A1* 3/2009 van Wijk ............. A01K 11/006
                                                              40/300
2010/0325926 A1* 12/2010 Hilpert ................ A01K 13/003
                                                              40/301

* cited by examiner

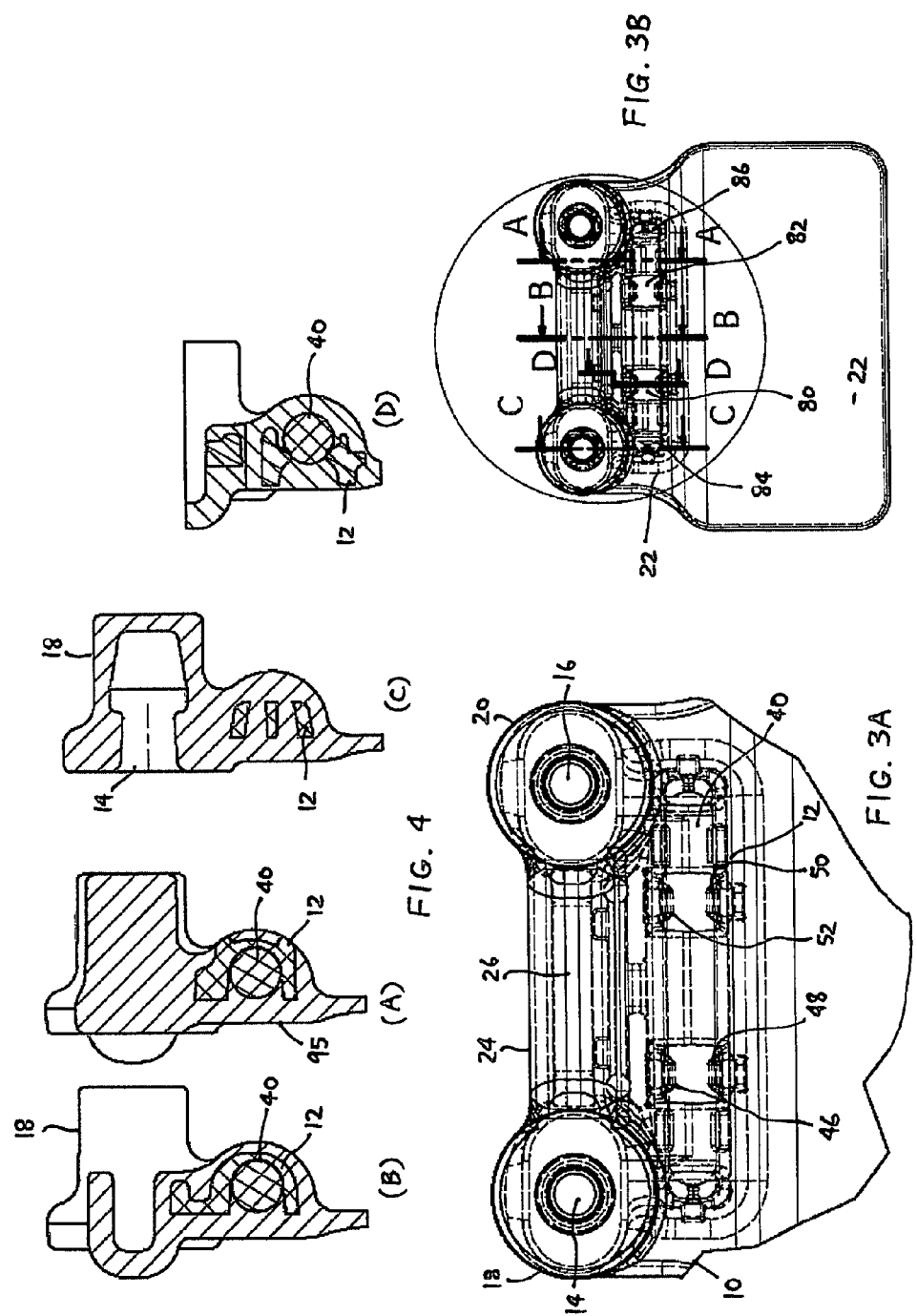

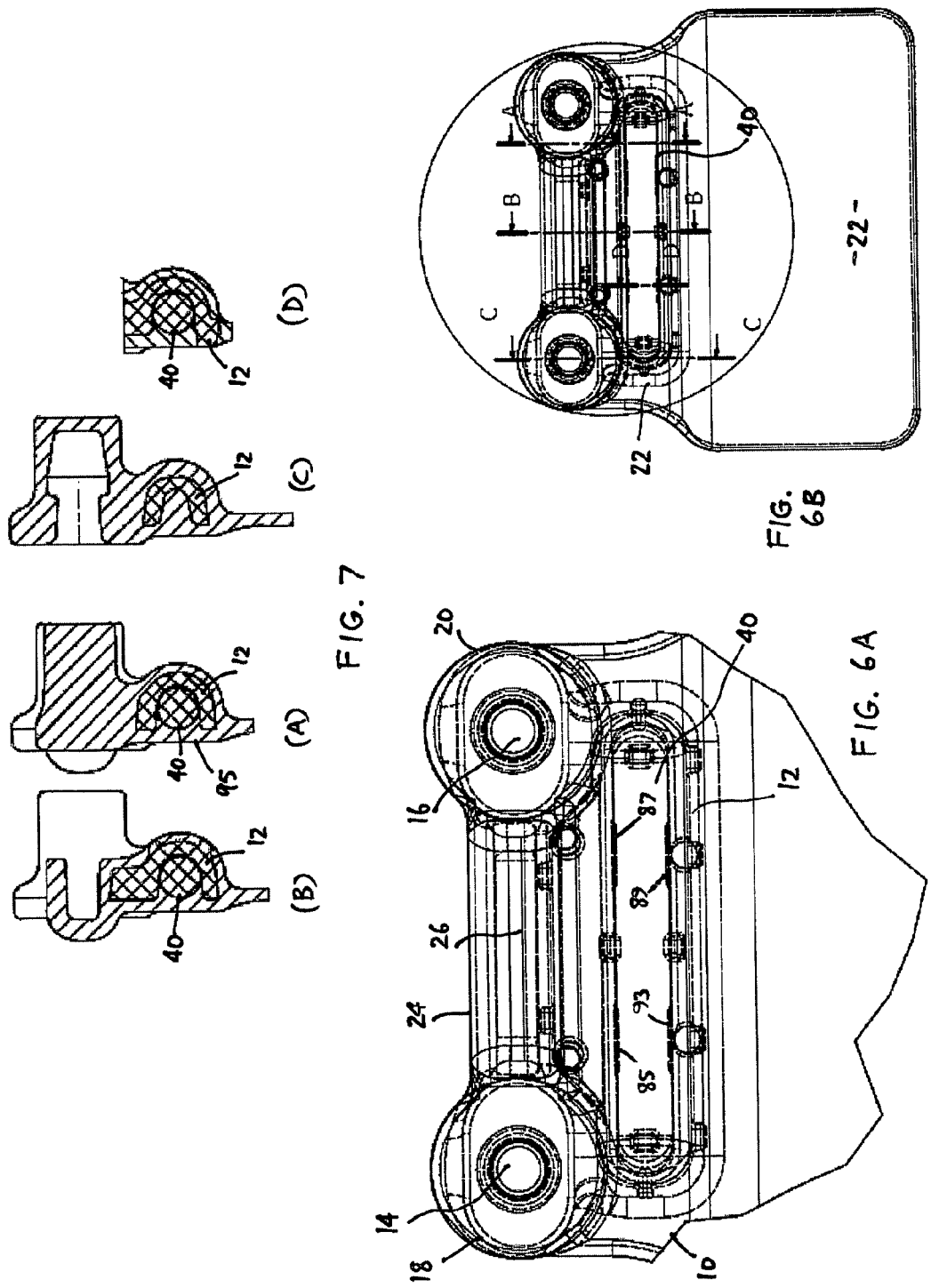

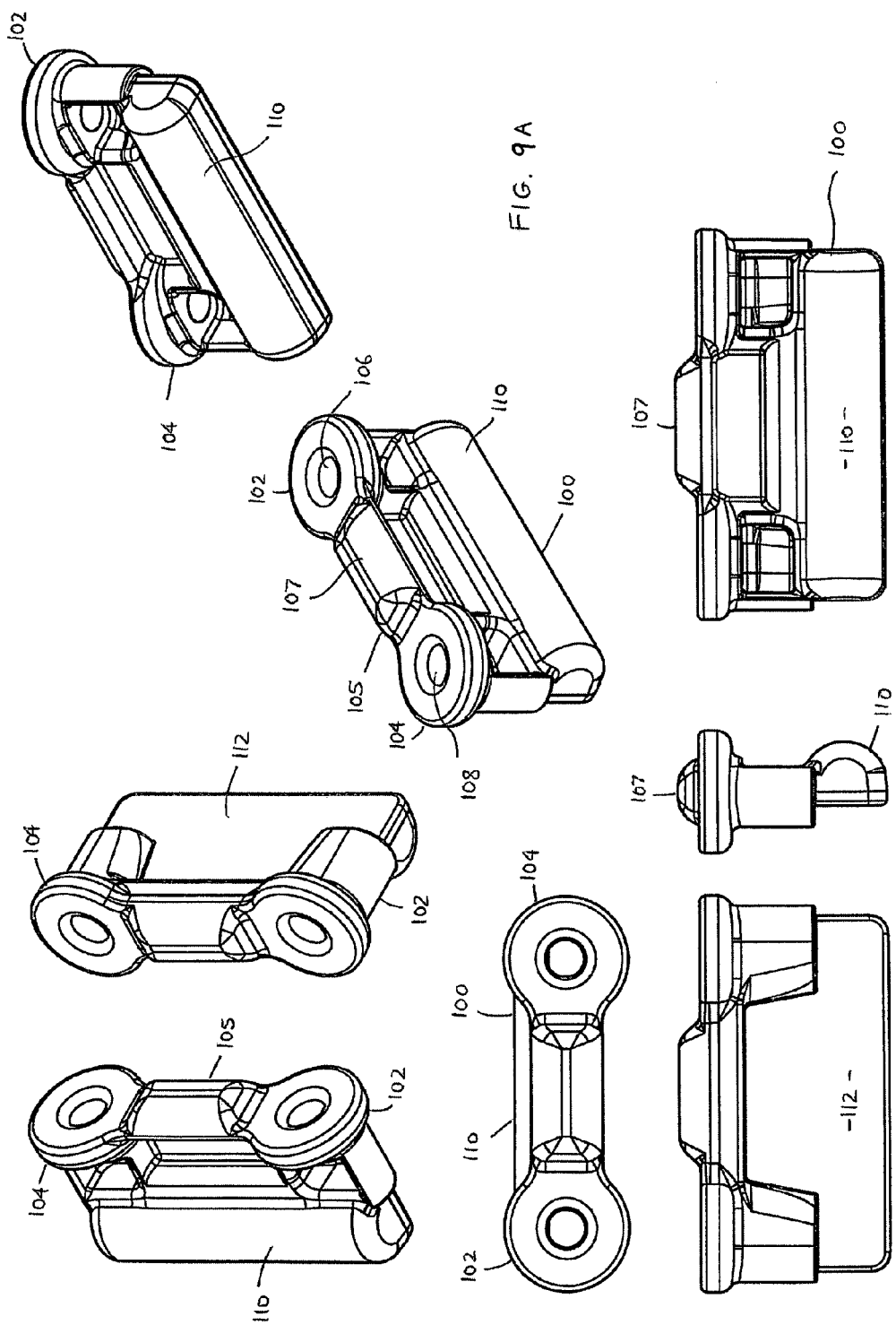

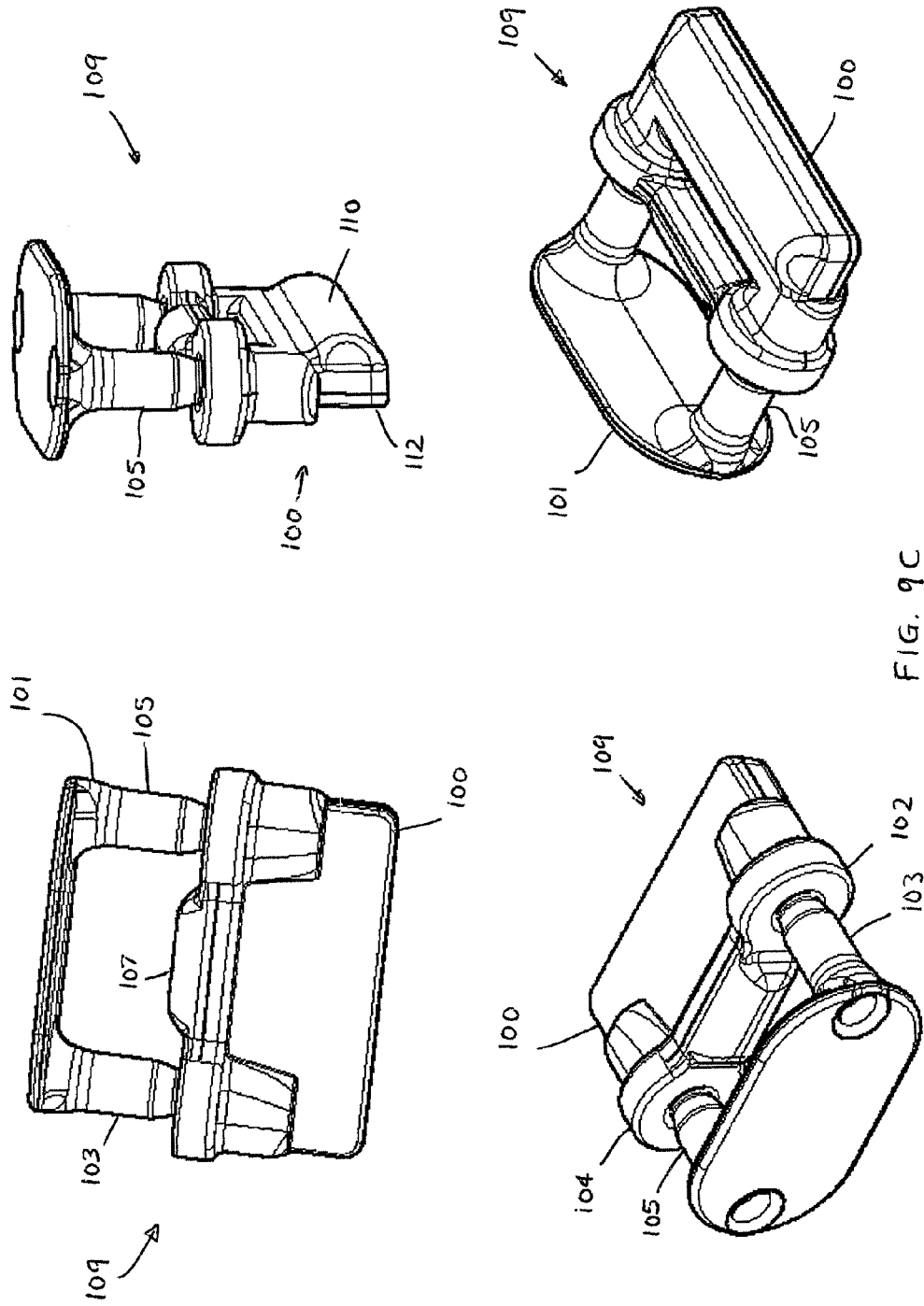

ANIMAL TAG

FIELD OF THE INVENTION

This invention relates to an improved animal tag and more particularly to an improved ear tag that includes an encapsulated transponder.

BACKGROUND OF THE INVENTION

In order to identify animals, such as cattle and sheep, ear tags have been used with transponders for a number of years. The transponder is usually embedded within the ear tag and whenever the animal is within range of a receiver, the information and identity stored in the transponder can be extracted.

The ear tags incorporating a transponder are currently made in a two part process called "clip and cap". The mould for the ear tag is made in two parts whereby the transponder is placed in one part of the mould and the second part, being the cap, is placed on top of the enclosed transponder and the two mould parts are welded together. Thus the transponder is welded into the identification tags, generally be one of two types of welding. A set of forks holds the transponder in the encapsulation. Using ultrasonic welding, the set of forks can bend or even break which weakens the hold of the transponders, making them loose within the tag and susceptible such that the transponders can fail. Ultrasonic welding or frictional welding weld polyurethane together and is subject to external shock, bumps and vibrations that makes the transponder vulnerable and therefore the information stored in the transponder can be affected. A lack of sufficient plastics material around the transponder leads to breakage of the transponder using these types of welding.

Other attempts to secure a transponder within an ear tag and to prevent dislodgement therefrom, for example, by cattle or sheep rubbing an ear or body against an object, have also used ultrasonic welding. However this technique has in many cases damaged the transponder and/or not provided an intact and secure seal for the transponder.

The present invention seeks to overcome at least one of the abovementioned disadvantages, including providing a robust animal tag with embedded transponder that withstands harsh treatment by an animal to which the tag is attached. The present invention also seeks to increase protection around the transponder by providing a cartridge or animal tag that substantially prevents internal movement of the transponder with increased rigidity and more material around the transponder.

SUMMARY OF THE INVENTION

According to a first aspect of the invention, there is provided a tag for attachment to an animal including:
a transponder casing housing a transponder;
a cartridge for housing the transponder casing;
a female component and a male component adapted to engage one another;
said male component having a pair of penetrating members and said female component having a pair of apertures, each aperture arranged to receive and retain a respective penetrating member when applied by an applicator through skin of the animal;
wherein the cartridge and transponder casing are encapsulated within said tag to prevent dislodgment and/or movement and/or damage to the transponder.

According to a second aspect of the invention, there is provided a method of forming an animal tag component encapsulating a transponder casing, including the steps of:
positioning and securing a transponder casing that houses the transponder in a cartridge;
securing the cartridge in a mould;
enabling or injecting liquid material to flow in the mould to completely enclose the cartridge and the transponder casing;
setting the material to form the animal tag component.

According to a third aspect of the invention, there is provided a cartridge forming part of an animal tag, including:
an elongate integral shell defining a space to house a transponder casing; said shell having an opening extending along the length of the shell to enable insertion of the transponder casing;
a set of clips extending from sides of the opening to retain the transponder casing in the space;
wherein the cartridge and transponder casing are encapsulated within said tag to prevent dislodgment and/or movement and/or damage to the transponder.

BRIEF DESCRIPTION OF THE DRAWINGS

A preferred embodiment of the invention will hereinafter be described, by way of example only, with reference to the figures in which:

FIG. 3A is a plan view of the female component of the tag;

FIG. 3B is an underneath view of the female component of the tag of FIG. 3A showing the cartridge;

FIG. 4A is a sectional view of the female component taken along the line A-A in FIG. 3B;

FIG. 4B is a sectional view of the female component taken along the line B-B in FIG. 3B;

FIG. 4C is a sectional view of the female component along the line C-C in FIG. 3B;

FIG. 4D is a sectional view taken along the line D-D of the female component across the cartridge and transponder casing in FIG. 3B;

FIG. 6A is a plan view of the female component of the tag according to a further embodiment;

FIG. 6B is an underneath view of the female component of the tag of FIG. 6A showing the cartridge;

FIG. 7A is a sectional view of the female component taken along the line A-A in FIG. 6B;

FIG. 7B is a sectional view of the female component taken along the line B-B in FIG. 6B;

FIG. 7C is a sectional view of the female component along the line C-C in FIG. 6B;

FIG. 7D is a sectional view taken along the line D-D of the female component across the cartridge and transponder casing in FIG. 6B;

FIGS. 9A and 9B show a series of perspective views depicting a further embodiment of a female component of an animal tag having a transponder and cartridge encapsulated therein; and FIG. 9C is a series of perspective views depicting a complete assembled tag with a male component fitted to the female components shown in FIGS. 9A and 9B.

DETAILED DESCRIPTION OF THE PREFERRED EMBODIMENT

Figure 1A:
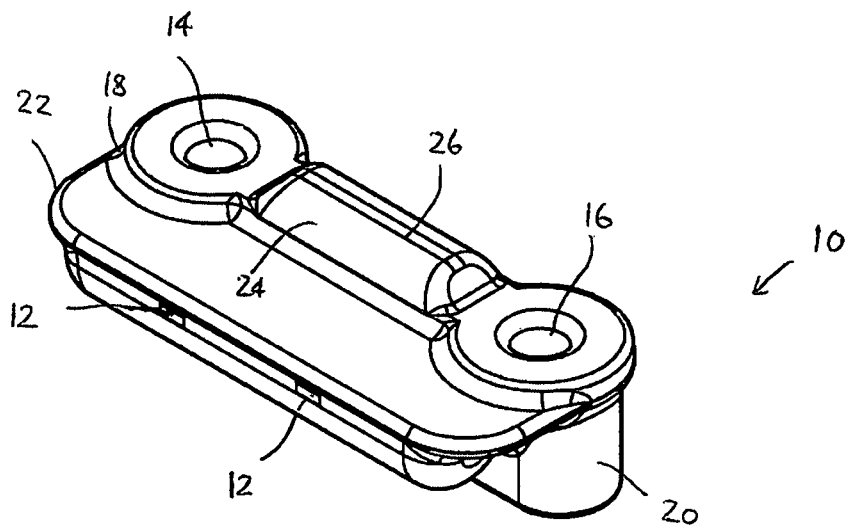
FIG. 1A is a perspective view of a female component of an animal tag having a transponder and cartridge encapsulated therein.
Figure 2A:
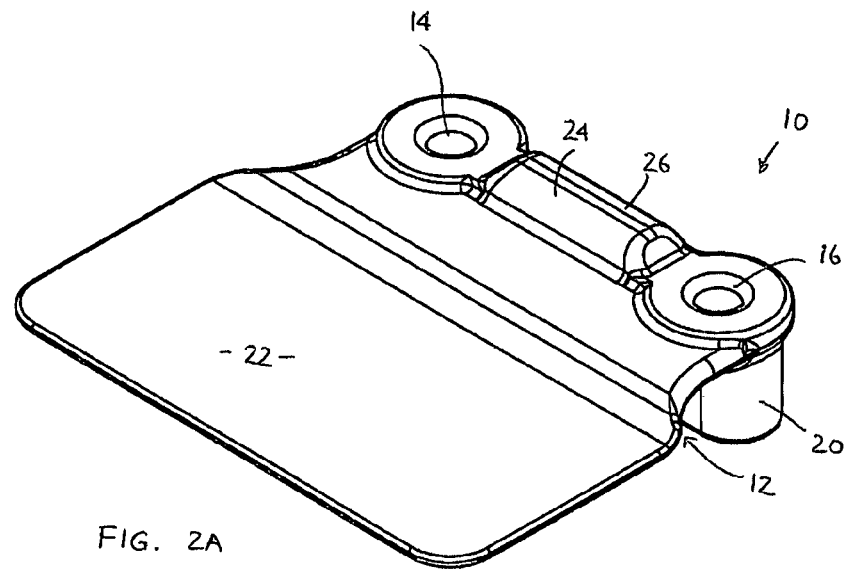
FIG. 2A is a perspective view of a modified female component of the animal tag shown in FIG. 1A having a flag or extending portion for labelling.
Figure 2B:
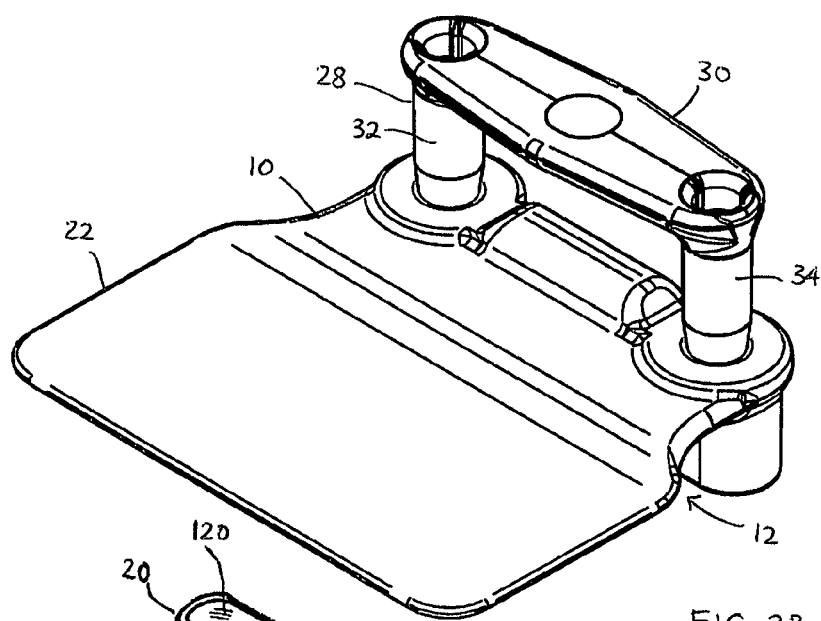
FIG. 2B is a perspective view showing a male component engaged with the female component of FIG. 2A to form the animal tag.
Figure 2C:
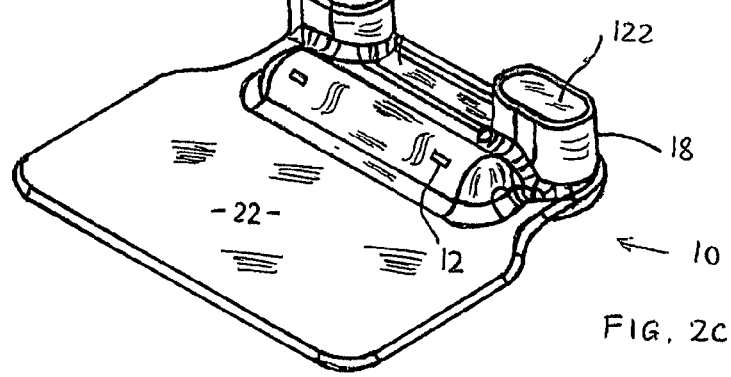
FIG. 2C is an underneath perspective view of the modified female component of FIG. 2A.

With reference to FIGS. 1A, 2A and 2C, there is shown a perspective view of a female component (10) of an animal tag, in particular an ear tag. The female component (10) is formed by an over-moulding process which fully encapsulates a cartridge (12) which houses a transponder. The process will be described hereinafter. The female portion or component (10) has a pair of apertures (14, 16) formed in respective support members (18, 20). The cartridge (12) is positioned in a laterally extended portion (22) of the female portion, the portion (22) extending outwardly and between each of the support members (18, 20). The flag or extended portion can be used to print information to identify the animal or owner or details about the transponder, for example. Located between the support members (18, 20) is an intermediate member (24) which includes a raised section (26) which enables air to flow against the skin of the animal when the ear tag is assembled on the animal, in order to assist in healing the wound created by tagging the animal.

Figure 1B:
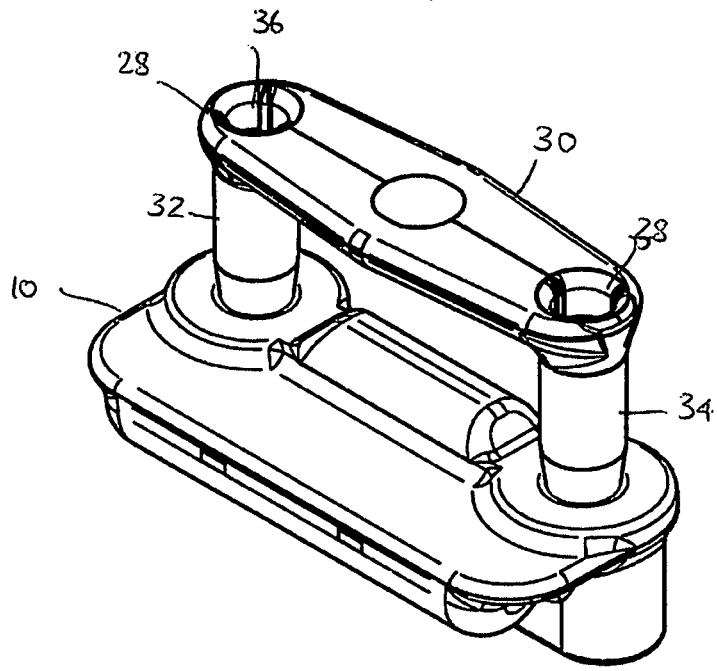
FIG. 1B is a perspective view of the tag showing a male component engaged with the female component of FIG. 1A.

Referring to FIGS. 1B and 2B, there is shown a male component (28) fully engaged with the female component (10), which is applied by an applicator having a pair of prongs. The male portion (28) has an intermediate portion (30), with substantially no overhang, and a pair of penetrating members (32, 34) which are applied by the applicator, and fit within apertures (14, 16) and are retained within the support structures (18, 20) which lock respective heads of the penetrating members (32, 34) in position so that the male component (28) cannot be dislodged from the female component (10) when fitted to the animal. The prongs of the applicator are fitted within respective apertures (36, 38) and when pressure is applied to the applicator, the penetrating heads of the penetrating members (32, 34) pierce the skin of the animal and are secured in the corresponding female component (10) on the other side of the skin fold, which is usually an ear of the animal. The tags shown in FIGS. 1B and 2B are particularly suited for application to cattle ears.

Figure 5:
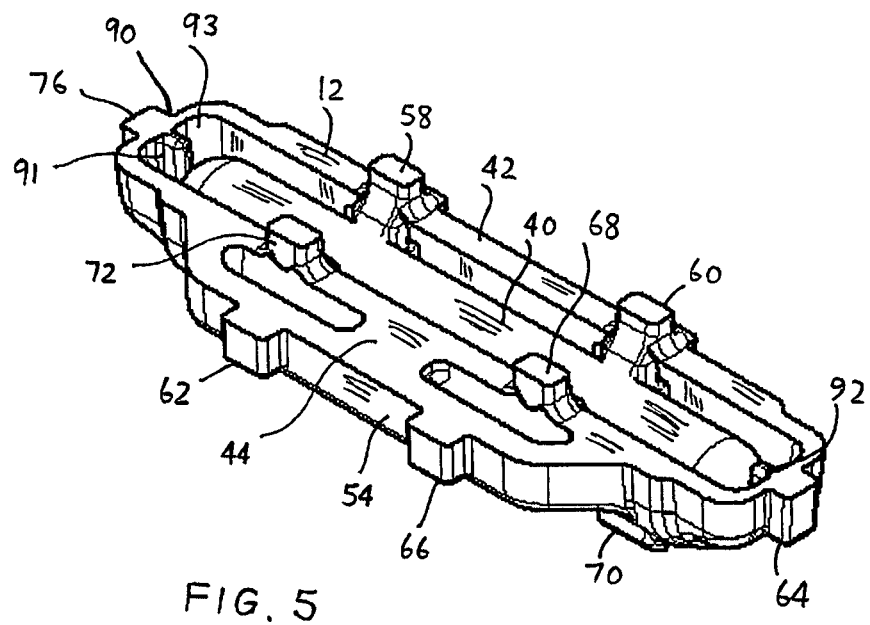
FIG. 5 is a perspective view of the cartridge of FIGS. 3A and 3B in which a transponder is shown fitted.

Referring to FIG. 3A there is shown a top view of the female component (10). It shows transponder casing (40), which houses a transponder, fitted within cartridge (12). FIG. 5 also shows the same arrangement whereby the transponder is fitted or encased by a transponder casing (40). The transponder casing (40) is preferably in the form of a glass tube or a plastic tube, both known for their strength and rigidity properties. The transponder casing (40) is fitted through an open portion of the cartridge (12) and is secured in place via clips extending inwardly across the open portion from each of the sides (42, 44) of the cartridge (12). The clips (46, 48, 50, 52) are more clearly seen in FIG. 3A. The casing (40) enclosing the transponder is robust and although less flexible can withstand the pressure and temperature involved with the over-moulding process whereby most of the transponder casing comes into contact with the material used to make the female component (10).

FIGS. 4A, 4B, 4C and 4D respectively show sectional views of the female component (10) along corresponding lines A-A, B-B, C-C and D-D in FIG. 3B.

Referring to FIG. 5 there is shown a cartridge (12) in which the transponder casing (40) is fitted. The cartridge (12) includes a handle (54) and protuberances (58, 60, 62, 64, 66, 68, 70, 72, 76) which enable the cartridge (12) to be held and located within a tool used in the moulding process. Essentially part of the mould or a mould tool holds the cartridge (12) in place and the protuberances (58) to (76) assist the positioning of the cartridge (12) and allow space for flowable liquid material to flow through and encapsulate the cartridge (12) and the transponder during the moulding process. By placing the transponder casing (40) within the cartridge (12) provides rigidity and protection against vibration, against vigorous external forces in the field applied by animals rubbing ears against an object, and protection against pressure and temperature involved in the over moulding process.

Figure 8:
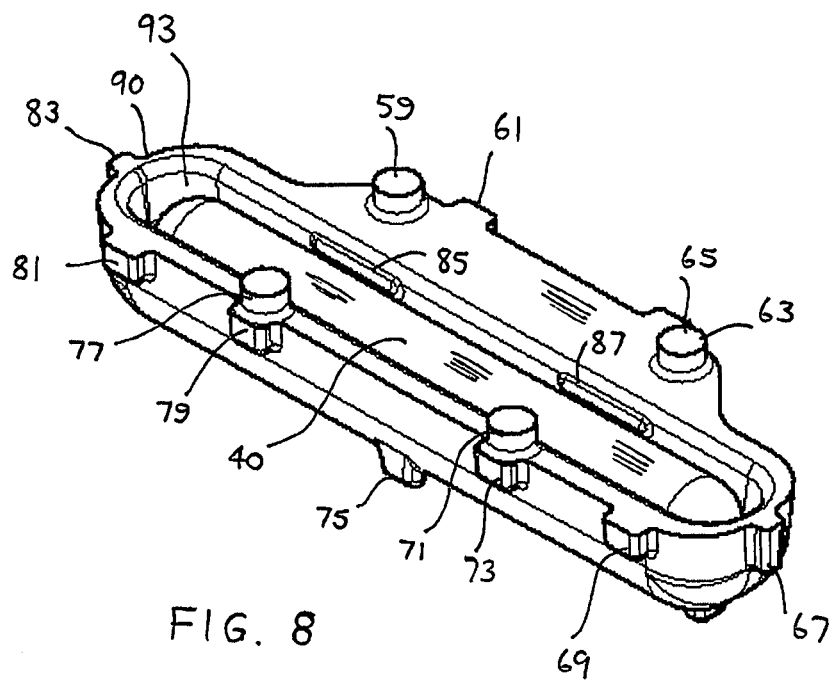
FIG. 8 is a perspective view of the cartridge of FIGS. 6A and 6B in which a transponder is shown fitted.

FIGS. 6A and 6B are similar in appearance to, and are similarly described with like reference numerals to FIGS. 3A and 3B respectively. Two particular differences exist in the embodiments of FIGS. 6A, 6B and 8 when compared respectively to FIGS. 3A, 3B and 5. The protuberances (59, 61, 63, 65, 67, 69, 71, 73, 75, 77, 79, 81 and 83) are different to those of (58, 60, 62, 64, 66, 68, 70, 72 and 76) in shape and location. Furthermore in the embodiment of FIG. 8 there is no corresponding handle (54) with apertures therethrough. Each of the protuberances in both embodiments of FIGS. 5 and 8 are designed to locate the cartridge (12) into the other half of the over-moulding tool (and push against this other half) as the tool closes and after the cartridge (12) has been placed in one half of the tool. If these protuberances were not there then the plastics material of polyurethane would not have room or space to fill and cover the cartridge (12) and casing (40). They provide an essential gap to allow the flowable plastics material to form around the cartridge (12) and casing (40). Another difference is that the cartridge (12) of FIG. 8 does not have any openings such as (80), (82), (84) or (86). Instead, during the over-moulding process (further described below), the polyurethane is injected through the tool and through the eventual formation of one or both of the support is members (18, 20) (or tag caps), for example anywhere on surfaces (120) or (122), which then is forced downwardly into the long opening (93) into which the casing (40) is fitted. From there the flowable plastics material is forced down the sides or walls of the casing (40) to consolidate the transponder and its casing (40) within the cartridge (12). Furthermore, a small gap exists between the tool and the bottom of the cartridge (12) made possible by protuberances (70) and (75) for example, and this space/gap is filled by the plastics material ensuring that the whole transponder, transponder casing (40) and cartridge (12) are encapsulated by the plastics material.

The clips (46, 48, 50, 52) of FIGS. 3A and 5 are slightly different to corresponding clips (85, 93, 89, 87) in FIGS. 6a and 8 in that the latter clips are effectively beads. These hold the casing (40) in place within the cartridge (12) when fitted within the over-moulding tool and during the over-moulding process. They also assist in attaching the casing (40) to the respective open half of the over-moulding tool.

FIGS. 7A, 7B, 7C and 7D respectively show sectional views of the female component (10) along corresponding lines A-A, B-B, C-C and D-D in FIG. 6B.

The preferred plastics material from which the male component (28) is made is Nylon 6, but it can also be polyurethane. The female component (10), which uses an over moulding process to fully encapsulate the transponder casing (40) and cartridge (12) uses polyurethane at a Shore Hardness of between 93A and 97A. The female component (10) can be made from other materials. The penetrating components and penetrating members of the male component (28) preferable use a Shore Hardness in the range of 70D to 90D, preferably 75D to 80D, or alternatively a Rockwell Hardness in the range (R) R95 to (R) R120. The cartridge (12) is either made from glass filled nylon at between 20% to 30%, polycarbonate or acetyl and is moulded from a specific moulding tool. The cartridge (12) has openings (80, 82, 84, 86), more clearly seen in FIGS. 3A and 3B, to enable molten or liquid plastic polyurethane to flow through and around the cartridge (12) and transponder casing (40). By having these openings, it enables the cartridge (12) to withstand the pressure and temperature of the over moulding process in which the polyurethane is injected. The melting point of the polyurethane is 190° and the process of over moulding takes part at the approximately temperature of 210° C.

After loading a transponder into the cartridge (12), the loaded cartridge (12) is placed in an over-moulding tool and is then moulded to form the polyurethane covering. The actual process of the injection moulding takes place through either or both surfaces (120) or (122) when it is positioned in the over-moulding tool. The polyurethane is melted to the approximate temperature of 210° C. and then once injected it flows to fill the areas around the transponder casing (40) and the cartridge (12) and then outwardly to fill the areas defined by the support structures (18, 20), the extended portion (22) and the connecting portion (24) which has the raised section (26). After about 10 to 15 minutes, the newly formed female component cools to room temperature and fully cures within 48 hours. The complete unit is as shown in FIG. 1A. A small thickness of polyurethane extends around the outer perimeter of the cartridge (12) and over the top of the major opening of the cartridge (12) which forms a substantially flat top of the extended portion (22) up to the raised section (26).

During the over-moulding process, the temperature range used for heating the raw materials in the mould to form the completed tag are controlled by a specific machine. The temperature used varies depending upon the position of a set screw used in the over-moulding process. Once the material is injected into the cavities of the tool/mould, which can include gates and runners, the material temperature is increased due to the material being sheared through different parts of the tool/mould through the various runners and gates. The temperature inside the cavities of the mould/tool can be varied by increasing or decreasing the number of runners and gates. These runners and gates are needed during the over-moulding process to ensure that the transponders remain intact and functioning.

At least three different types of tags can be produced by the over-moulding process, including an ET40 which is used for cattle and is tamper-proof, an ET45 used for sheep which is also tamper-proof and an ET46 for sheep which is not tamper-proof. The ET46 tag can be reused by the end user.

A space exists between a respective end of the transponder casing (40) and an inner protuberance (91) located on the inside of each end (90, 92) of cartridge (12). This enables a cut to be made in the cartridge (12) at each end (90, 92) when the transponder casing and transponder are no longer required or need to be replaced. Once the ends are cut, an elongate object can be used to push the casing (40) out of the cartridge (12). Both the transponder and transponder casing can be recycled for further use. Alternatively, a slit may be cut through the flat portion of the polyurethane covering of the female component (10), as indicated at (95) in FIG. 4A, above the transponder casing (40). Once the slit is cut, then the transponder casing (40) can be removed from the cartridge (12) and the transponder reused.

Figure 9B:
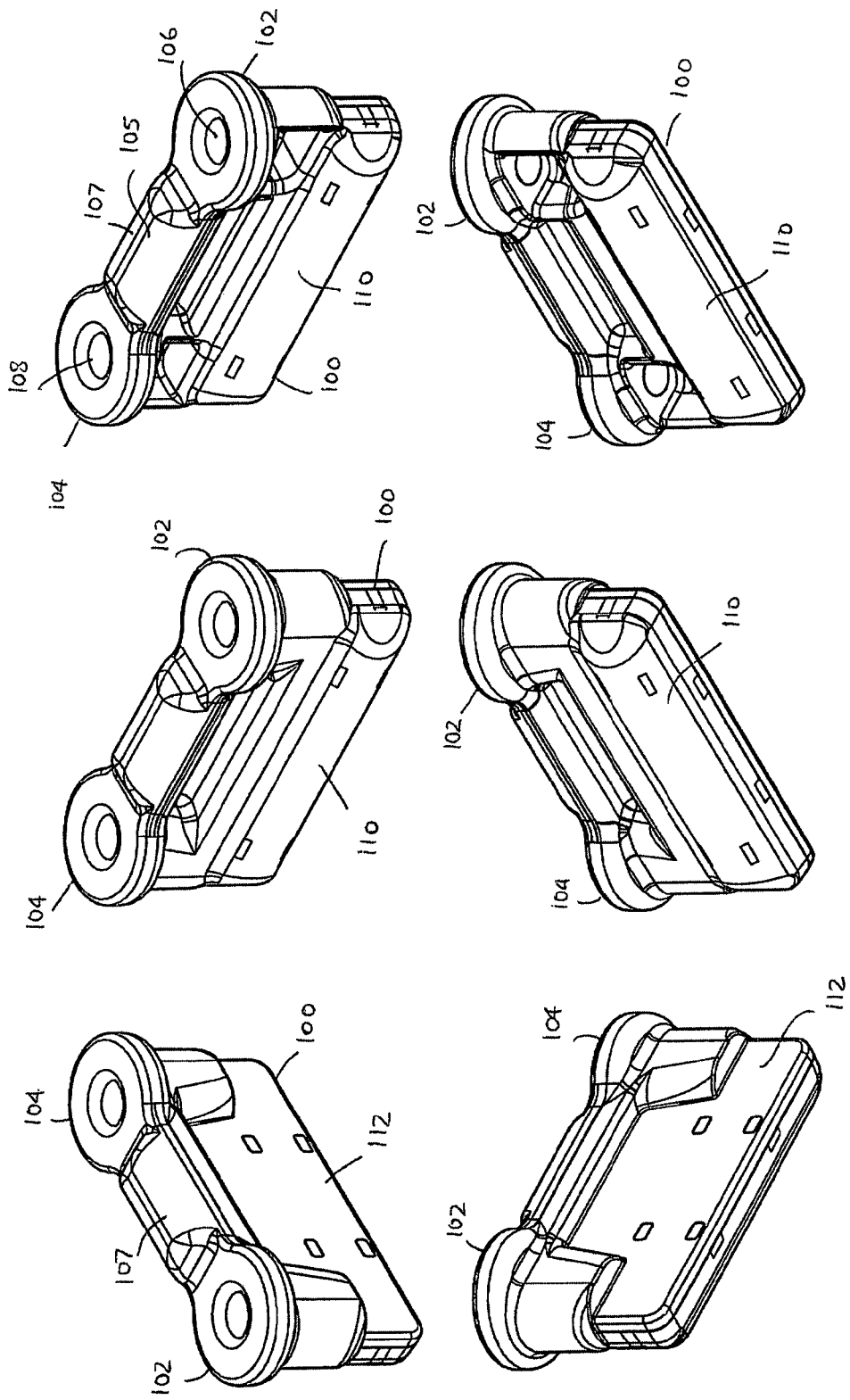

Referring to FIGS. 9A and 9B there is shown a series of views of a female component (100) of a tag particularly suited to apply to sheep. Instead of the extended portion (22) of the embodiment of FIGS. 1A, 1B, 2A and 2B being lateral, the component (100) has a downwardly depending extended portion (112) below and between two support structures (102, 104) that respectively include apertures (106, 108) for receiving respective penetrating members of a male component of the tag. Bridging the two support structures (102, 104) is an intermediate portion (105) having a raised section (107) to provide clearance for air to pass over the skin of the sheep when the tag is fitted to the sheep. At the bottom of the depending extended portion (112) is a portion (110) in which is housed the cartridge and transponder casing. The female component (100) is produced by the same over-moulding process described in relation to FIGS. 1 to 4. In FIG. 9C shows perspective views of a male portion or component (101) fitted to the female component (100) as a completely assembled tag (109). Penetrating member (103) of portion (101) fits into support structure (102) while penetrating member (105) fits into support structure (104).

The invention claimed is:

1. A tag for attachment to an animal including:
 a transponder casing housing a transponder;
 a cartridge for housing the transponder casing;
 a female component and a male component adapted to engage one another;
 said female component comprising a first end and a second end, said first end comprising a first aperture and said second end comprising a second aperture; and
 said male component comprising a first end and a second end, said first end comprising a first penetrating member and said second end comprising a second penetrating member, wherein said first aperture is adapted to receive and retain said first penetrating member and said second aperture is adapted to simultaneously receive and retain said second penetrating member;
 wherein the cartridge and transponder casing are fully encapsulated within said female component or said male component.

2. A tag according to claim 1 wherein the cartridge and transponder casing are fully encapsulated in the female component.

3. A tag according to claim 1 wherein the cartridge and transponder casing are fully encapsulated in the male component.

4. A tag according to claim 1 wherein the cartridge includes a full opening on one side of the cartridge to enable insertion and extraction of the transponder casing.

5. A tag according to claim 1 wherein the cartridge includes a full opening on one side of the cartridge to enable heated liquid material to flow in and around said cartridge during an over-moulding process.

6. A tag according to claim 5 wherein the cartridge is rounded on a side opposite to the full opening and substantially flat on the side of the full opening.

7. A tag according to claim 5 wherein the encapsulating material surrounding the cartridge is cut in line with said full opening in the cartridge in order to remove the transponder casing from the cartridge and to enable reuse of the transponder.

8. A tag according to claim 1 further including an extending projection in the female component in which the cartridge and transponder casing are positioned.

9. A tag according to claim 1 wherein a gap exists at each end of the cartridge when the transponder casing in positioned therein, in order to enable a cut to be made in the cartridge to release the transponder casing for reuse of the transponder.

10. A method of forming an animal tag component as set forth in claim 1 for encapsulating a transponder casing, including the steps of:
   positioning and securing a transponder casing that houses the transponder in a cartridge;
   securing the cartridge in a mould;
   enabling liquid material to flow in the mould to completely enclose the cartridge and the transponder casing;
   setting the material to form the animal tag component.

11. A method according to claim 10 further including providing an opening in the cartridge to enable the liquid material to flow in and around the cartridge and around the transponder casing.

12. A method according to claim 10 wherein the enabling step further includes inserting the liquid material into at least two parts of the mould adjacent the cartridge.

13. An animal tag component resulting from the method of claim 10.

14. A cartridge forming part of an animal tag as set forth in claim 1, including:
   an elongate integral shell defining a space to house a transponder casing; said shell having an opening extending along the length of the shell to enable insertion of the transponder casing;
   a set of clips extending from sides of the opening to retain the transponder casing in the space;
   wherein the cartridge and transponder casing are fully encapsulated within said tag to prevent dislodgment and/or movement and/or damage to the transponder.

15. A cartridge according to claim 14 further including protuberances for holding and locating said cartridge within a tool used in a process for forming said animal tag.

16. A tag according to claim 1, said female component further comprising a first support member in which is located said first aperture, a second support member in which is located said second aperture, and a laterally extended portion extending outward and between said first and second support members.

17. A tag according to claim 1, said female component further comprising an intermediate member located between said first end and second end, said intermediate member comprising a raised section.

* * * * *